United States Patent
de Bonet et al.

(10) Patent No.: US 7,818,758 B2
(45) Date of Patent: Oct. 19, 2010

(54) EFFICIENT MULTI-PROTOCOL SOFTWARE ARCHITECTURE WITH SHARED RESOURCES FOR DIFFERENT APPLICATIONS

(75) Inventors: Jeremy S. de Bonet, N. Andover, MA (US); Todd A. Stiers, Berkeley, CA (US); Phillip Alvelda, VII, Oakland, CA (US)

(73) Assignee: Mobitv, Inc., Emeryville, CA (US)

( * ) Notice: Subject to any disclaimer, the term of this patent is extended or adjusted under 35 U.S.C. 154(b) by 1118 days.

(21) Appl. No.: 11/415,748

(22) Filed: May 2, 2006

(65) Prior Publication Data

US 2006/0200562 A1    Sep. 7, 2006

Related U.S. Application Data

(63) Continuation of application No. 10/342,113, filed on Jan. 14, 2003, now Pat. No. 7,073,178.

(60) Provisional application No. 60/349,424, filed on Jan. 18, 2002, provisional application No. 60/349,344, filed on Jan. 18, 2002.

(51) Int. Cl.
    *G06F 3/00*     (2006.01)
    *G06F 9/44*     (2006.01)
(52) U.S. Cl. ...................... 719/328; 717/168
(58) Field of Classification Search ............... 719/328, 719/330; 717/168
    See application file for complete search history.

(56) References Cited

U.S. PATENT DOCUMENTS

| 5,497,434 A | 3/1996 | Wilson |
| 5,551,046 A | 8/1996 | Mohan et al. |
| 5,825,917 A | 10/1998 | Suzuki |
| 5,842,014 A | 11/1998 | Brooks et al. |
| 5,915,131 A * | 6/1999 | Knight et al. ................. 710/72 |
| 6,005,979 A | 12/1999 | Chang et al. |
| 6,009,192 A | 12/1999 | Klassen et al. |
| 6,026,440 A | 2/2000 | Shrader et al. |

(Continued)

FOREIGN PATENT DOCUMENTS

EP    0 884 679 A1    12/1998

(Continued)

OTHER PUBLICATIONS

Kaj Gronbaek, Designing Dexter-based Hypermedia services for the world Wide web, 1997.*

(Continued)

*Primary Examiner*—Lechi Truong
(74) *Attorney, Agent, or Firm*—Sprinkle IP Law Group (57) ABSTRACT

A method and system can comprise a software architecture that allows different applications in the same or different communications protocols to interact with shared resources. More specifically, code for a computer program may be written to increase the amount of code that is generic to (i.e., shared by) more than one application or communications protocol and reduce the amount of code that handle application-specific or protocol-specific actions. In one embodiment, a transaction may be broken down into a set of discrete actions. The discrete actions may include functions that are common to more than one application. These functions may be part of the shared resources. Each application may have its own set of software plug-in modules for the discrete actions.

15 Claims, 8 Drawing Sheets

U.S. PATENT DOCUMENTS

| | | | |
|---|---|---|---|
| 6,083,276 | A | 7/2000 | Davidson et al. |
| 6,148,336 | A | 11/2000 | Thomas et al. |
| 6,275,860 | B1 | 8/2001 | DeForest et al. |
| 6,366,916 | B1 | 4/2002 | Baer et al. |
| 6,377,939 | B1 * | 4/2002 | Young ............ 705/34 |
| 6,560,606 | B1 | 5/2003 | Young |
| 6,842,856 | B2 | 1/2005 | Shenassa et al. |
| 6,985,905 | B2 * | 1/2006 | Prompt et al. ............ 707/102 |
| 7,065,566 | B2 * | 6/2006 | Menard et al. ............ 709/223 |
| 7,644,120 | B2 * | 1/2010 | Todorov et al. ............ 709/203 |
| 2002/0194244 | A1 | 12/2002 | Raventos |
| 2003/0200280 | A1 * | 10/2003 | Austin ............ 709/217 |

FOREIGN PATENT DOCUMENTS

EP        1 187 019 A2    3/2002

OTHER PUBLICATIONS

International Search Report, Nov. 15, 2004.
International Search Report, Dec. 4, 2002.
Robert W. Floyd & Louis Steinberg "*An adaptive algorithm for spatial gray scale*" SID 75 Digest: 36-37, 1975.
Paul Heckbert, "*Color image quantization for frame buffer display*" Computer Graphics, 16(3):297-307, Jul. 1982.
C.E. Shannon "*A mathematical theory of communication*" The Bell System Technical Journal, 27(3): 379-423, Jul. 1948.
C.E. Shannon "*A mathematic theory of communication, Part III*" The Bell System Technical Journal, pp. 623-656, Jul. 1948.
T.A. Welch "*A technique for high-performance data compression*" Computer, 17(6): 8-19, Jun. 1984.
Jacob Ziv "*Coding theorems for individual sequences*" IEEE Transactions on Information Theory, 24(4): 405-412, Jul. 1978.
Jacob Ziv & Abraham Lempel "*A universal algorithm for Sequential data compression*" IEEE Transactions on Information Theory, 24(3): 337-343, May 1977.
Jacob Ziv & Abraham Lempel "*Compression of individual sequences vis variable-rate coding*" IEEE Transactions on Information Theory, 24(5): 530-536, Sep. 1978.

* cited by examiner

EFFICIENT MULTI-PROTOCOL SOFTWARE ARCHITECTURE WITH SHARED RESOURCES FOR DIFFERENT APPLICATIONS

RELATED APPLICATIONS

This application is a continuation of, and claims the benefit of U.S. patent application Ser. No. 10/342,113, filed Jan. 14, 2003, entitled "Method and System of Performing Transactions Using Shared Resources and Different Applications," which issued as U.S. Pat. No. 7,073,178 on Jul. 4, 2006 and which claims-priority under 35 U.S.C. §119(e) to U.S. Patent Application Nos. 60/349,424, entitled "Network Proxy Platform that Simultaneously Supports Data Transformation, Storage, and Manipulation for Multiple Protocols" by de Bonet et al., filed on Jan. 18, 2002, and 60/349,344 entitled "A Modular Plug-In Transaction Processing Architecture" by de Bonet et al. filed Jan. 18, 2002, both of which are assigned to the current assignee hereof and are incorporated herein by reference.

FIELD OF THE INVENTION

The invention relates in general to methods and systems for performing transactions, and more particularly, to methods and systems of performing transactions using shared resources and different applications.

DESCRIPTION OF THE RELATED ART

Traditionally, different applications used in communicating over a network have their own code specialized for their particular application. Even if the computer applications are similar and use the same protocol, effectively, the applications are written from scratch or copied and extensively edited. Application development times are long due to the lengthy manual operations used in writing or editing the applications.

SUMMARY OF THE INVENTION

A method and system can comprise a software architecture that allows different applications in the same or different communications protocols to interact with shared resources. More specifically, code for a computer program may be written to increase the amount of code that is generic to (i.e., shared by) more than one communications protocol and reduce the amount of code that handle application-specific actions. In one embodiment, a transaction may be broken down into a set of discrete actions. The discrete actions may include functions that are common to more than one application. These functions may be performed by the shared resources.

For each action, code that is specific to a particular protocol or particular application may be written as part of a software plug-in module with function calls to functions of the shared resources. Each application may have its own set of software plug-in modules for the discrete actions. New protocols and new applications can be added by developing a new set of plug-in modules instead of writing an entire new program. The software architecture can reduce development time, increase the likelihood that more protocols will be properly supported, and reduce the burden on hardware and software resources.

In one set of embodiments, a system for performing transactions can comprise a shared resource, a first application, and a second application. The first application may be configured to send a first call to the shared resource, and the second application may be configured to send a second call to the shared resource.

In still another set of embodiments, a method of developing a system for performing transactions using shared resources can comprise generating a first application and generating a second application. Each of the first and second applications may be configured to make a call to at least one of the shared resources.

In a further set of embodiments, a method of performing electronic transactions can comprise receiving a first communication from a first application and sending a first call to a resource in response to the first communication. The method can also comprise receiving a second communication from a second application and sending a second call to the resource in response to the second communication.

In still other sets of embodiments, data processing system readable media can comprise code that includes instructions for carrying out the methods and may be used on the systems.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A method and system can comprise a software architecture that allows different applications in the same or different communications protocols to interact with shared resources within a computer. More specifically, code for a computer program may be written to increase the amount of code that is generic to (i.e., shared by) more than one application or communications protocol and reduce the amount of code that handle application-specific or protocol-specific actions. In one embodiment, a transaction may be broken down into a set of discrete actions. The discrete actions may include functions that are common to more than one network application. These functions may be performed by the shared resources.

For each action, code that is specific to a particular protocol or application may be written as part of a software plug-in module with function calls to functions of the shared resources. Each software plug-in module may substantially act similar to a manager for the action, where common tasks are delegated to the shared resources and the module performs specialized functions. Each protocol may have its own set of software plug-in modules for the discrete actions. New applications and support for new protocols can be added by developing a new set of plug-in modules instead of writing an entirely new program. New applications for the same protocol may be developed by replacing or editing as little as one plug-in module from a different application in the same protocol. The software architecture can reduce development time, increase the likelihood that new applications may be developed quickly with fewer changes from an existing application, more protocols will be properly supported, and reduce the burden on hardware and software resources.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "software component" is intended to mean at least a portion of a computer program (i.e., a software application). An example includes a software plug-in module or the like. Different software components may reside in the same computer program or in different computer programs on the same computer or different computers.

Figure 1:
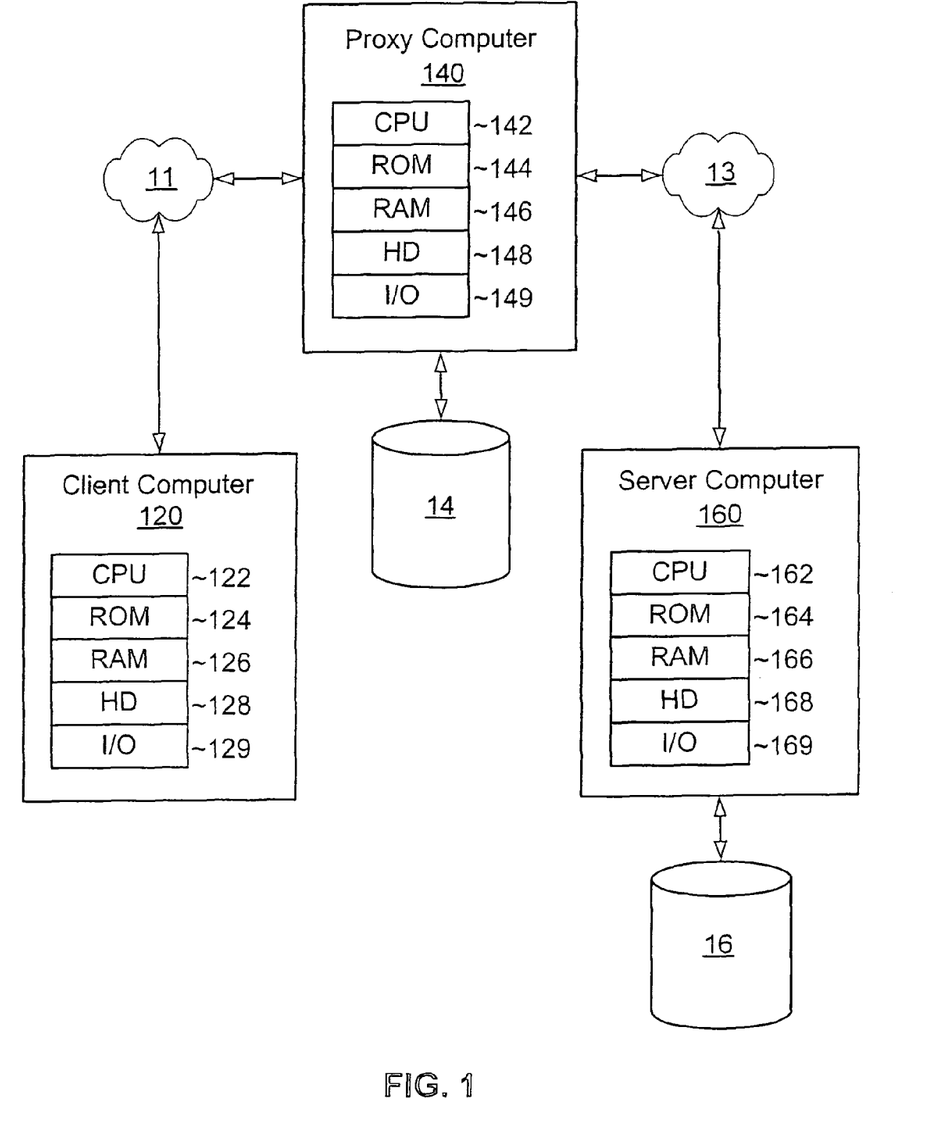
FIG. 1 includes an illustration of a hardware configuration for performing transactions in response to an electronic communication in accordance with a specific, non-limiting embodiment of the present invention.

Before discussing embodiments of the present invention, an exemplary hardware architecture for using embodiments of the present invention is described. FIG. 1 illustrates such an exemplary hardware architecture and includes client computer 120, proxy computer 140, and server computer 160. Client computer 120 and proxy computer 140 are bi-directionally coupled to network 11, and proxy computer 140 and server computer 160 are bi-directionally coupled to network 13. Each of networks 11 and 13 may be an internal network or an external network (e.g., the Internet). In one embodiment, networks 11 and 13 may be the same network, such as the Internet. Computers 140 and 160 may be bi-directionally coupled to databases 14 and 16, respectively.

Client computer 120 can include a desktop computer, a laptop computer, a personal digital assistant, a cellular phone, or nearly other device capable of communicating over network 11. Other client computers (not shown) may also be bi-directionally coupled to network 11. The proxy computer 140 can be a server computer, but in another embodiment may be a client computer. Other server computers (not shown) similar to server computer 160 may be bi-directionally coupled to network 13.

In an alternative embodiment, each of proxy computer 140 and server computer 160 may be replaced by a plurality of computers (not shown) that may be interconnected to each other over a network or a combination of networks. For simplicity, a single system is shown for each of proxy computer 140 and server computer 160.

The client computer 120 can include central processing unit ("CPU") 122, read-only memory ("ROM") 124, random access memory ("RAM") 126, hard drive ("HD") or storage memory 128, and input/output device(s) ("I/O") 129. I/O 129 can include a keyboard, monitor, printer, electronic pointing device (e.g., mouse, trackball, stylus, etc.), or the like. Proxy computer 140 can include CPU 142, ROM 144, RAM 146, HD 148, and I/O 149, and server computer 160 can include CPU 162, ROM 164, RAM 166, HD 168, and I/O 169.

Each of the computers in FIG. 1 may have more than one CPU, ROM, RAM, HD, I/O, or other hardware components. For simplicity, each computer is illustrated as having one of each of the hardware components, even if more than one is used. Note that FIG. 1 is a simplification of an exemplary hardware configuration. Many other alternative hardware configurations are possible and known to skilled artisans.

Each of computers 120, 140, and 160 is an example of a data processing system. ROM 124, 144, and 164; RAM 126, 146, and 166; HD 128, 148, and 168; and databases 14 and 16 can include media that can be read by CPU 122, 142, or 162. Therefore, each of these types of memories includes a data processing system readable medium. These memories may be internal or external to computers 120, 140, or 160.

Figure 2:
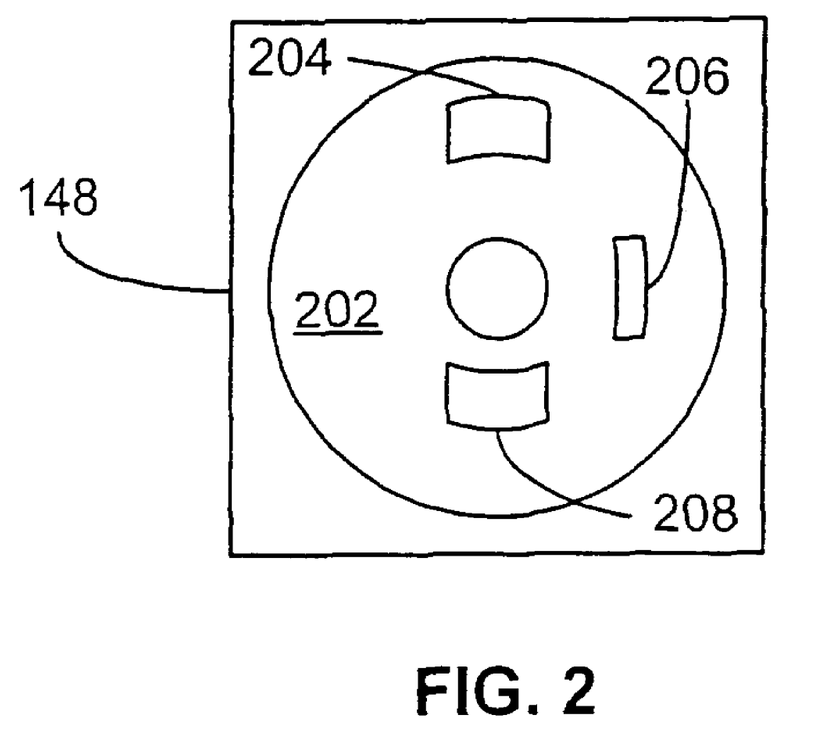
FIG. 2 includes an illustration of a data processing system storage medium including software code having instructions in accordance with an embodiment of the present invention.

Portions of the methods described herein may be implemented in suitable software code that may reside within ROM 124, 144, or 164, RAM 126, 146, or 166, or HD 128, 148, or 168. The instructions in an embodiment of the present invention may be contained on a data storage device, such as HD 148. FIG. 2 illustrates a combination of software code elements 204, 206, and 208 that are embodied within a data processing system readable medium 202, on HD 148. Alternatively, the instructions may be stored as software code elements on a DASD array, magnetic tape, floppy diskette, optical storage device, or other appropriate data processing system readable medium or storage device.

In an illustrative embodiment of the invention, the computer-executable instructions may be lines of compiled assembly, C, $C^{++}$, Java, or other language code. Other architectures may be used. For example, the functions of any one of the computers may be performed by a different computer shown in FIG. 1. Additionally, a computer program or its software components with such code may be embodied in more than one data processing system readable medium in more than one computer.

In the hardware configuration above, the various software components may reside on a single computer or on any combination of separate computers. In alternative embodiments, some or all of the software components may reside on the same computer. For example, one or more the software component(s) of the proxy computer 140 could reside on the client computer 120, the server computer 160, or both. In still another embodiment, the proxy computer 140 and database 14 may not be required if the functions performed by the proxy computer 140 are merged into client computer 120 or server computer 160. In such an embodiment, the client computer 120 and server computer 160 may be bi-directionally coupled to the same network (not shown in FIG. 1).

Communications between any of the computers in FIG. 1 can be accomplished using electronic, optical, radio-frequency, or other signals. For example, when a user is at client computer 120, client computer 120 may convert the signals to a human understandable form when sending a communication to the user and may convert input from a human to appropriate electronic, optical, radio-frequency, or other signals to be used by, computers 140 or 160. Similarly, when an operator is at server computer 160, server computer 160 may convert the signals to a human understandable form when sending a communication to the operator and may convert input from a human to appropriate electronic, optical, radio-frequency, or other signals to be used by computers 120, 140, or 160.

Attention is now directed to the methodology of developing a software architecture for the software in accordance with one embodiment of the present invention. The method can comprise breaking down a transaction into a set of discrete actions. The actual definitions used for separating the transaction into the discrete actions is variable and may be selected by skilled artisans in manners that best suit their particular transactions, hardware requirements, and software requirements. The method can also include determining which functions within the set of discrete actions are common to more than one application. As more are identified, the number of shared resources can increase and the amount of application-specific code can be decreased. Therefore, skilled artisans are encouraged to examine the software from many different levels of abstraction to discover potential shared resources that may otherwise be missed.

The method can further comprise generating software components for the discrete actions. A set of software plug-in modules can correspond to the different discrete actions for the transaction. Each application may have its own set of software plug-in modules. The amount of code within each software plug-in module should be kept relatively low if the identification of shared resources was performed properly. To the extent code for any shared resources does not currently exist, code for the shared resources should be generated to maximize its ability to be used by as many different plug-in modules as possible.

At least two of the software plug-in modules for different applications, whether they use the same or different protocols, can make function calls to any one or more of the shared resources. For different applications using the same protocol, only a request manipulation plug-in module, a content manipulation plug-in module, or both may be the only modules changed. Therefore, creating new application for the same protocol may be simplified because other plug-in modules used for the application may be copied from another application using the same protocol. These other plug-in modules may be substantially the same between the applications. By replacing or editing the request manipulation plug-in module, content manipulation plug-in module, or both, new applications may be developed very quickly.

Regarding applications in different protocols, each protocol may have a module that performs substantially the same action as any or all of the similar module(s) for the other protocol(s) though reducing this duplicative code by combining the common functionality is preferable.

Figure 3:
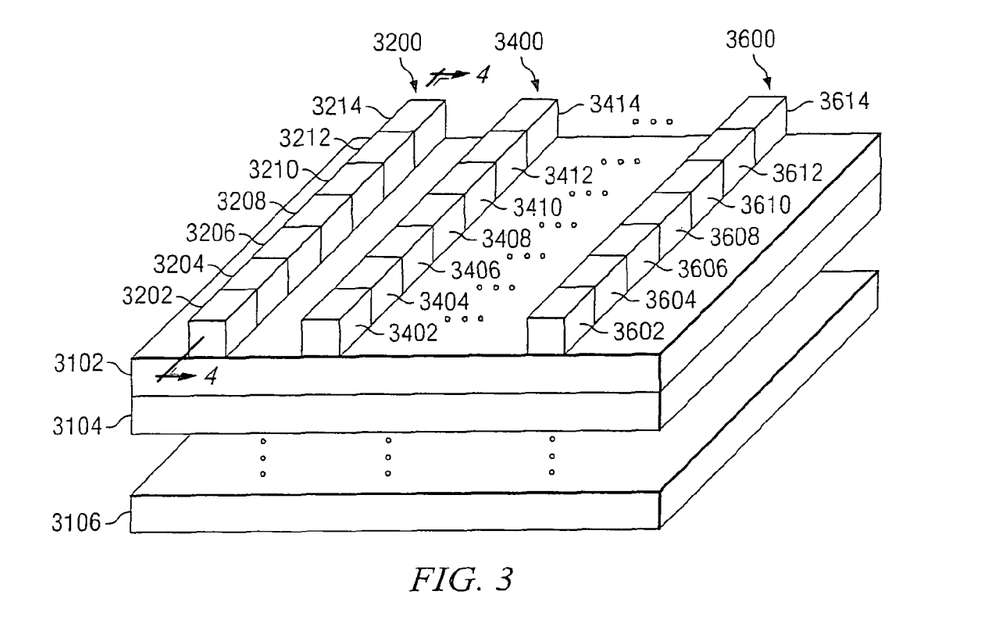
FIG. 3 includes an illustration of an exemplary software architecture in accordance with an embodiment of the present invention.
Figure 4:
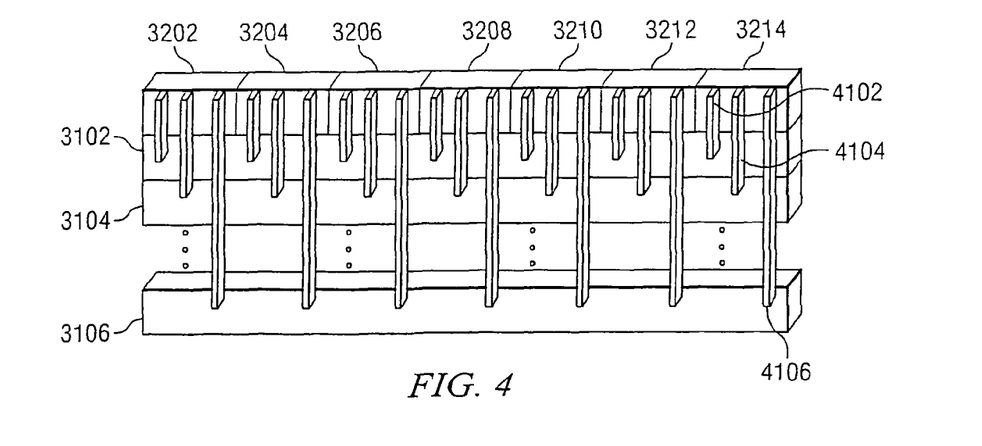
FIG. 4 includes an illustration of a cross-sectional view of the software architecture illustration of FIG. 3 in accordance with an embodiment of the present invention.

Attention is now directed to the software architecture of the software in accordance with one embodiment of the present invention. The software architecture is illustrated in FIGS. 3 and 4 and is directed towards an electronic transaction that can be performed over a network. A basic idea behind the architecture is to allow programming code for shared resources to be commonly used by as many different network applications as possible. Note that all of the resources may or may not be shared by all the applications. The programming code for each application-specific plug-in module may include code to connect the incoming communication in any supported application to the shared resources. By limiting the code within the plug-in modules, a user of the software architecture can reduce development time, increase the likelihood that more applications in the same or different protocols will be properly supported (especially proprietary protocols that may be used by only a limited number of computers or users), and reduce the burden on hardware and software resources for different applications because only relatively small plug-in modules may be used.

In FIG. 3, each row of boxes 3200, 3400, and 3600 represents different applications in the same or different protocols. For example, row 3200 may represent a first application using HTTP, row 3400 may represent a different application using HTTP, and row 3600 may represent yet another application in a different protocol, such as POP, SNMP, WAP, and the like. Note that the series of dots between rows 3400 and 3600 indicate that many other applications in the same or different protocols may be present. Additionally, the architecture may be configured to allow the addition of future applications. The software architecture easily supports at least three different and potentially many more protocols.

Referring to row 3200, each of the boxes 3202 through 3214 represents different stages (actions) that may occur during an electronic transaction. For example, box 3202 may represent a request reception plug-in module, box 3204 may represent an authorization plug-in module, box 3206 may represent a request manipulation plug-in module, box 3208 may represent a content retrieval plug-in module, box 3210 may represents a content manipulation plug-in module, box 3212 may represent a content delivery plug-in module, and box 3214 may represent a post-response communication plug-in module (e.g., acknowledgement, billing, etc.). Each module may correspond to one or more of the discrete actions. Details about the individual plug-in modules are described later in this specification. Note that the other rows 3400 and 3600 include corresponding boxes for substantially the same types of actions except that they are designed for different applications. More specifically, box 3402 represents an incoming message reception plug-in module for a different application using the same protocol as box 3202, and box 3602 represents an incoming message reception plug-in module for yet another application using a different protocol compared to box 3202.

New applications that make use of already-supported protocols can be developed with a minimum of effort. This is achieved by creating a new row, which makes use of protocol specific plug-ins used in another row and combines them with other plug-ins developed for the specific application at hand. Some plug-in modules may be substantially the same for many different applications in the same protocol. In different protocols, the plug-in modules for at least some of the different applications may provide substantially the same functionality, although the code within those plug-in modules may be different compared to similar modules for the other protocols.

Within the software architecture, shared resources are illustrated as planes 3102, 3104, and 3106 that lie beneath each of the rows 3200, 3400, and 3600. Referring to FIG. 4, interfaces may be made to each of the shared resources for each plug-in module. Specifically referring to box 3214, functional connectivity 4102 links module 3214 and shared resource 3102. Likewise, functional connectivity 4104 links module 3214 and shared resource 3104, and functional connectivity 4106 links module 3214 shared resource 3106. Links 4102, 4104, and 4106 can be achieved by function calls to the shared resources. Examples of the shared resources may include a content cache, a parameter cache, a connection pool, a domain name server cache, a clock, a counter, a database, a global variables space (e.g., a logging database), or the like. A list of potential shared resources is nearly limitless. Note that not all shared resources may be connected to all modules along a row. For example, modules 3202 and 3204 may not need access to the content cache because they may not receive or process content returned for a request. Each connection from a client may be handled independently on its own thread. However in other embodiments, fewer threads or a single thread can be used to operate all connections to a specific row that supports a particular application or protocol. Unless stated to the contrary, the method below is described from the perspective of proxy computer 140.

Figure 5:
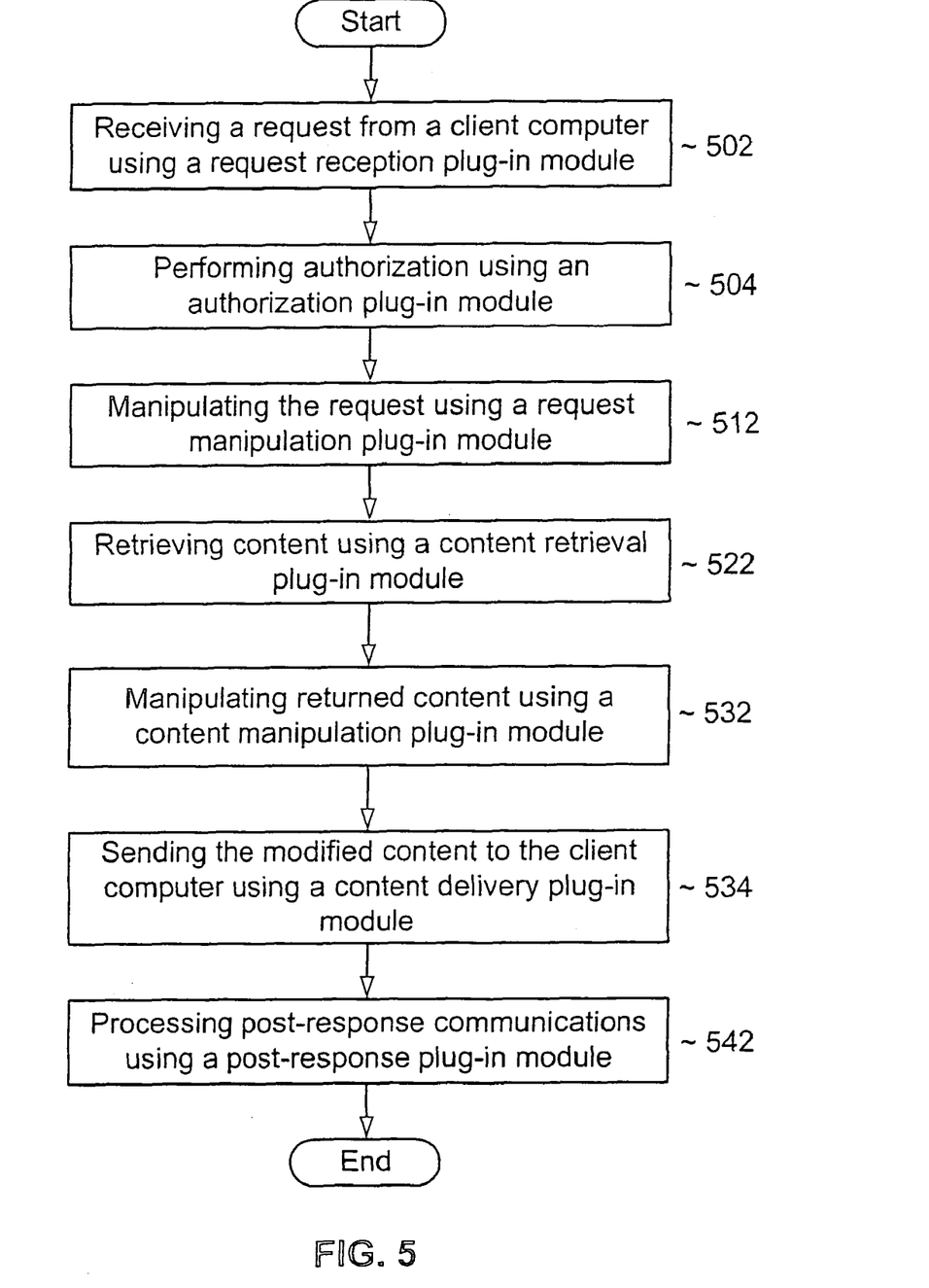
FIG. 5 includes a flow diagram of a method of performing an electronic transaction in accordance with an embodiment of the present invention.

FIG. 5 includes a flow diagram of a method of performing an electronic transaction that corresponds to the software plug-in modules that lie along any of rows 3200, 3400, and 3600. Note that all modules are not required and that functions of some modules may be combined with others (e.g., authorization may be part of processing an initial request). The process flow diagram will be briefly covered followed by a more detailed description of each module.

The method can comprise receiving a request from a client computer using a request reception plug-in module (block 502) and performing authorization using an authorization plug-in module (block 504). The method can also comprise manipulating a request using a request manipulation plug-in module (block 512). The method can further comprise retrieving content using a content retrieval plug-in module (block 522). The method can yet further comprise manipulating returned content using a content manipulation plug-in module (block 532) and sending the modified content to the client computer using a content delivery plug-in module (block 534). The method can still further comprise processing post-response communications using a post-response plug-in module (block 542).

Note that not all of the activities described in the process flow diagram are required, that a limitation within a specific activity may not be required, and that further activities may be performed in addition to those illustrated. Also, some of the activities may be performed substantially simultaneously during with other activities. After reading this specification, skilled artisans will be capable of determining what activities can be used for their specific needs.

Attention is now directed to the protocol-specific plug-in modules along the rows 3200, 3400, and 3600 and how they are related to the activities illustrated in FIG. 5. Although the discussion is directed to row 3200, the corresponding modules along other rows can provide similar functionality. Also, in the example below, client computer 120 is sending a request for content to proxy computer 140, and server computer 160 is providing content in response to the request. The flow of information could be in the opposite direction (server computer 160 seeking information from client computer 120).

The method can comprise receiving a request from client computer 120 using request reception plug-in module 3202 (block 502 in FIG. 5). Request reception plug-in module 3202 can be used when a request from client computer 120 is received or accessed by proxy computer 140. Module 3202 can initially generate an associative array from portions of the header of the request. Part or all of the associative array may be used by the other modules along the same row. The associative array may provide information that can be part of function calls to the shared resources. Any or all the data (including the associative array) may be passed from any prior plug-in module (e.g., module 3202) to any or all the subsequent plug-in modules along the same row (e.g., 3204, 3206, 3208, 3210, 3212, or 3214).

The method can also comprise performing authorization using authorization plug-in module 3204 (block 504). The authorization plug-in module 3204 is optional and can be used for determining whether a user at client computer 120 has proper authorization. The authorization modules may be based on an Internet Protocol ("IP") address or a name and a password. Module 3204 may send the IP address or name and password to a shared resource to determine if the user is allowed access.

The method can further comprise manipulating the request using request manipulation plug-in module 3206 (block 512). Request manipulation plug-in module 3206 may be used to modify, replace, or otherwise manipulate the request. For example, proxy computer 140 may have code to redirect a URL within a request to a different URL. More specifically, proxy computer 140 may make a function call to that shared resource using the requested URL. The shared resource may pass the different URL back to module 3206. Module 3206 may have the logic to put the different URL in the correct protocol, so that it will be understood by a computer that may receive the redirected request.

The method can yet further comprise retrieving content using content retrieval plug-in module 3208 (block 522). Content retrieval plug-in module 3208 may be used to send the request and receive or access content in response to the original request or manipulated request. More specifically, a request originating from client computer 120 may have been processed by proxy computer 140 before being received by server computer 160. Content from server computer 160, in response to the processed request from proxy computer 140, would be processed using module 3208. Similar to module 3202, the code may parse the content from server computer 160 into a header portion and a content portion and append that information onto a previously generated associative array.

The method can still further comprise manipulating returned content from the server computer using content manipulation plug-in module 3210 (block 532). Content manipulation plug-in module 3210 may be used to add or modify content before sending it to client computer 120. More specifically, proxy computer 140 may add advertisements or supplementary information from third parties to the content provided by server computer 160. In an alternative embodiment, part or all of the content originating from server computer 160 may be deleted or replaced with other content.

The method can comprise sending the modified content to the client computer using content delivery plug-in module 3212 (block 534). Content delivery plug-in module 3212 may be used to route the content, after manipulation, if any, to client computer 120. Some of the information in the associative array generated when the original request from client computer 120 was processed may be used by module 3212 when sending the outgoing content to client computer 120.

The method can also comprise processing post-response communications using post-response plug-in module 3214 (block 542). Post-response communication plug-in module 3214 may be used for acknowledgement, billing, or other purposes. For example, after content is successfully sent to client computer 120 from module 3212, module 3124 could then charge the user's credit card for that transaction. Alternatively, module 3214 may look for a signal that service to or from client computer 120 or server computer 160 is being terminated for the current transaction. Such post-response processing may be helpful in avoiding invoices or other bills sent to a user at client computer 120 if a product or service was either incomplete or defective or to properly reflect the connect time for a transaction.

Along similar lines, one of the planes as illustrated in FIG. 3 may include global space variables that may need to be used by other shared resources, proxy computer 140, or the plug-in modules. System statistics are examples of information that may be within a global variable space. This information may be useful to proxy computer 140 or another computer, such as client computer 120 or server computer 160, in monitoring activity. The statistics may include how many computers are connected to proxy computer 140, the amount of time each of those computers are connected to proxy computer 140, the amount of or time lapsed during transactions being processed through proxy computer 140, or the like.

These global variables may be used in conjunction with a module, such as authorization module 3204. If too many users are currently logged into proxy computer 140, authorization may be denied even if the computer attempting a connection to proxy computer 140 has proper security clearance. After another transaction by another client computer is terminated, a signal from module 3214 can be sent to the logging system within the shared resources. A new client computer may now gain access to the services provided by proxy computer 140 after the connection from the other transaction is terminated.

Figure 6:
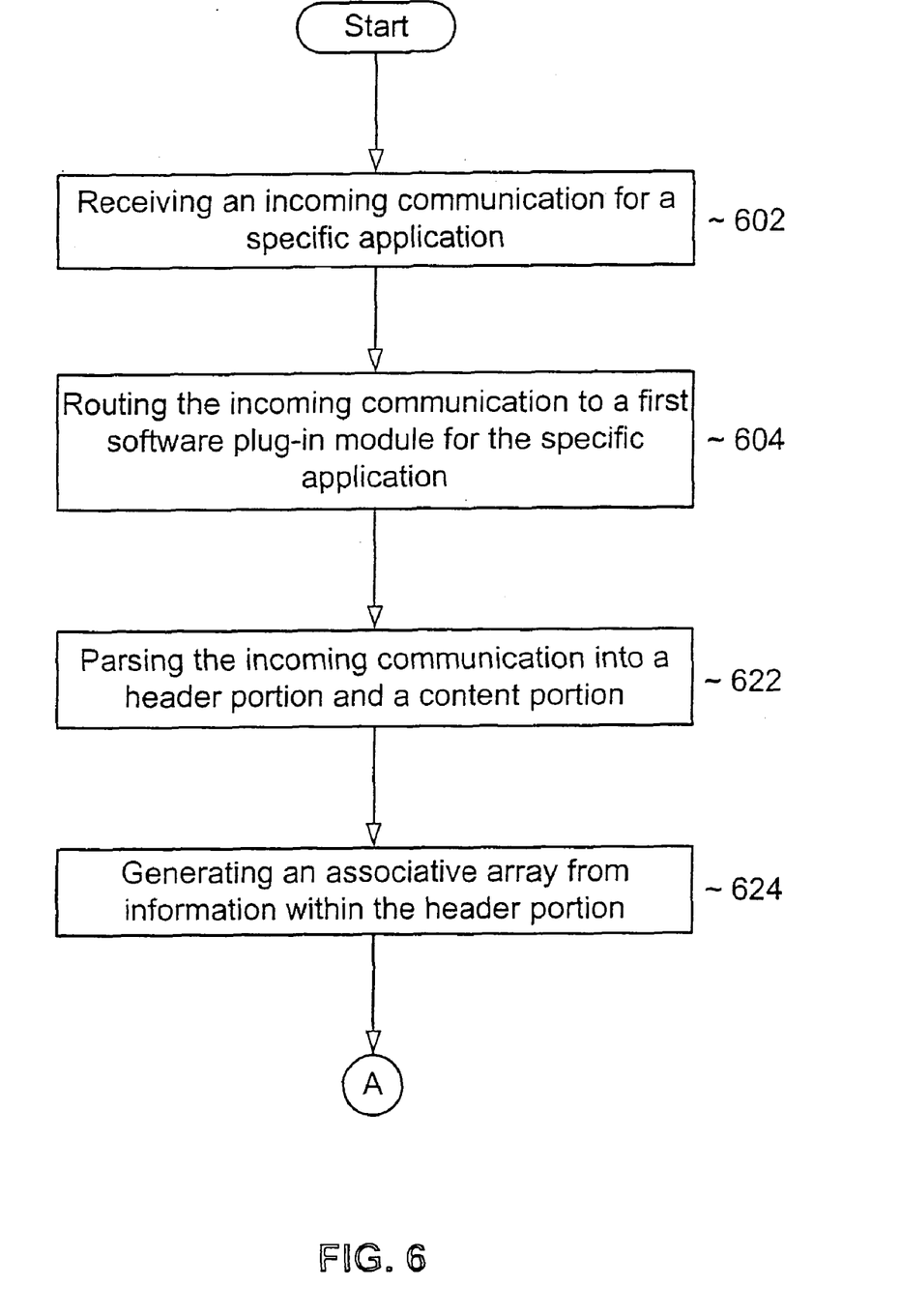
FIGS. 6-8 include a more detailed flow diagram illustrating some of the operations of software plug-in modules and how they may interact with other software plug-in modules for different actions within the same transaction in accordance with an embodiment of the present invention.
Figure 7:
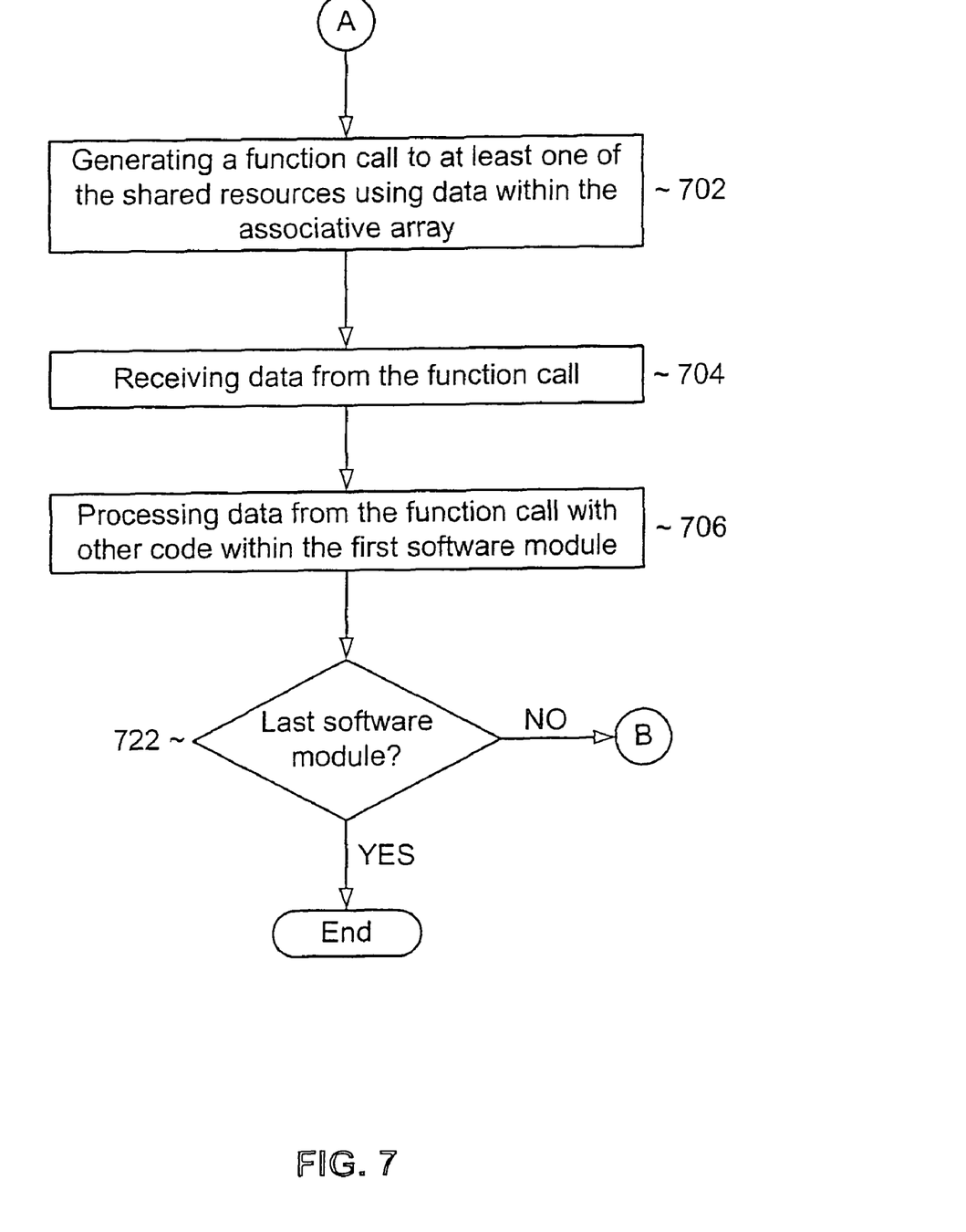
Figure 8:
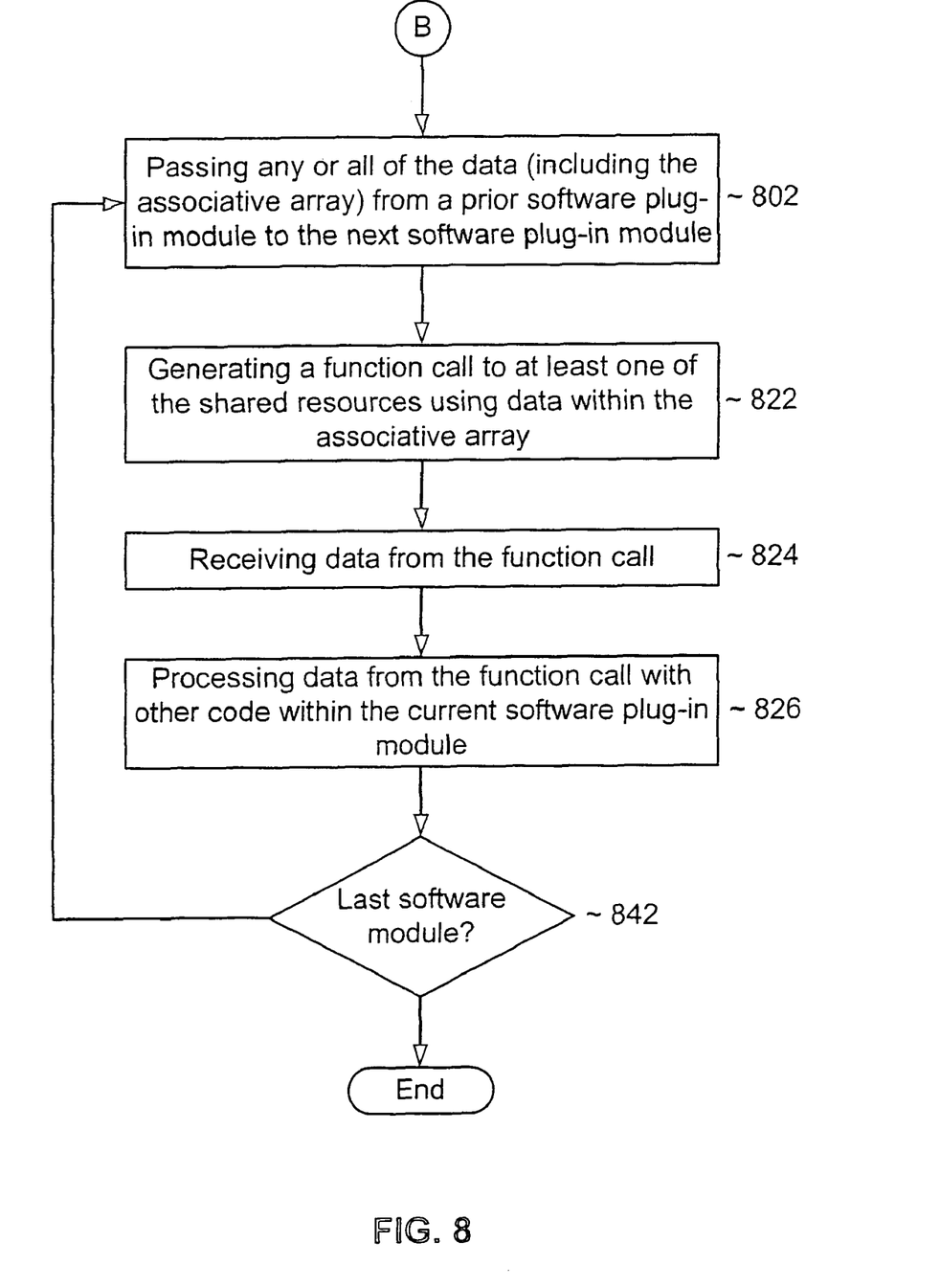

Attention is now directed to more specific activities that may be performed by a specific module, and how that specific module may interact with other modules for the same transaction using a specific application. The process flow diagram illustrated in FIGS. 6-8 is used to describe some of the specific activities. Again, unless stated to the contrary, the method is primarily described from the perspective of proxy computer 140.

To aid in understanding the method in FIGS. 6-8, a specific example is used and occasionally referenced. In the example, an incoming communication may be a request from client computer 120 sent to proxy computer 140 for www.yahoo.com. The client computer 120 is communicating using HTTP, using a Netscape™ browser (of AOL Time Warner, Inc. of New York, N.Y.), and has a MacOS X™ operating system (of Apple Computer, Inc. of Cupertino, Calif.).

Referring to FIG. 6, the method can comprise receiving an incoming communication for a specific application (block 602). The communication can comprise a request, a message, or other form of communication. The communication can be sent by client computer 120 and received or accessed by proxy computer 140 via network 11. Proxy computer 140 can access or read at least a portion of the incoming communication and determine the specific application for the communication. In the example, the incoming communication is a request from client computer 120 sent to proxy computer 140 for www.yahoo.com. The incoming communication will also contain other information within the header of the request. In the example, the other information can include the browser and operating system of client computer 120.

After determining the application for the communication, proxy computer 140 can determine which row 3200, 3400, 3600, or other or row of plug-in modules will be used for the transaction. At this point in the method, proxy computer 140 may activate any or all of the plug-in modules for the row corresponding to the specific application. In one embodiment, plug-in modules within each row may be activated only as they are first used. Referring to the example, the request is for an application corresponding to row 3200. Therefore, plug-in module 3202 may be activated. If the communication is for another application, plug-in module 3402 or 3602 may be activated for the particular application.

The method can further comprise routing the incoming communication to a first software plug-in module for the specific application (block 604). Proxy computer 140 can route the request to request reception software plug-in module 3202 because the incoming request uses the application corresponding to row 3200.

The method can comprise parsing the incoming communication into a header portion and a content portion (block 622). The parsing can be performed by module 3202 to obtain information from the request.

The method can also comprise generating an associative array using information contained within the header portion (block 624). The associative array can include nearly any finite number of rows. Each row can comprise a key and a value. The key can comprise a parameter within the header portion, and the value can comprise a value for that parameter. In general, the header portion may include one or more lines of a command followed by a command argument. The command may be a key, and the command argument may be the corresponding value for the key. The associative array may be searched by the key or the value.

By knowing conventions used by each of the protocols for incoming communications and the characteristics of headers used for those protocols, formation of the associative array can be performed without complicated coding requirements. The associative array is flexible regarding the number of rows and allows different sizes of associative arrays to be used for different protocols.

For HTTP, one of the lines within the header may include a line with "User-Agent: Mozilla/5.0 (Macintosh; U; PPC Mac OS X; en-US; rv:1.1) Gecko." The key will be "User-Agent," and the value will be "Mozilla/5.0 (Macintosh; U; PPC Mac OS X; en-US; rv:1.1) Gecko." For POP, a line may include "RETR 27," where 27 is an object identifier for is a particular item to be retrieved. The key will be "COMMAND," and the value will be "RETR." A second entry will be made with a key of "ARGUMENT" and a value of "27." For SNMP, a line may include "get 47.12.112.38," where 47.12.112.38 corresponds to an object identifier. The key will be "COMMAND", and the value will be "GET," and a second entry will have the key "ARGUMENT" and the value "47.12.112.38."

The content may or may not be part of the associative array. If it is, the associative array can include a key of "CONTENT" and the entire content data block as the value. For an image, the content may be a very large amount of data. Alternatively, the associative array may be paired with a data pointer that points to the data block, rather than incorporating it directly into the associative array.

Turning to the example, the associative array may include information as shown in Table 1 below. Descriptive names are used instead of actual names to aid in understanding the associative array. Also, the associative array may include many more rows. Because the associative array may be searched by key or value, the order of the rows is unimportant.

TABLE 1

Exemplary associative array

| KEY | VALUE |
| --- | --- |
| Request | GET http://www.yahoo.com HTTP/1.0 |
| Request-Document | http://www.yahoo.com |
| User-Agent | Mozilla/5.0 (Macintosh; U; PPC Mac OS X; en-US; rv: 1.1) Gecko |
| Browser | Netscape |
| Operating system | MacOS X |

The method can also comprise generating a function call to at least one of the shared resources using data within the associative array (block 702 in FIG. 7). In the example, proxy computer 140 can make a function call to a shared resource, more specifically to a clock (shared resource) and a logging system (another shared resource) to get the time and log the beginning of the transaction. The logging information may include the time and a transaction identifier. Note that some of the information within the associative array could be sent with the function call to the shared resource.

The method can further comprise receiving data from the function call (block 704). In the example, the transaction identifier may be passed back to module 3202. The method can still further comprise processing data from the function call with other code within the first software module (block 706). Module 3202 may be more focused on processing the incoming message rather than processing data coming back from the function call. Other modules, such as the content deliver plug-in module 3212, may perform such data processing. Note that the application-specific processing may occur before, during, or after function call(s), if any, are made to the shared resource(s).

A determination may be made whether the first software plug-in module is the last software plug-in module (diamond 722). If so, the method may end. Otherwise, the method may continue with passing any or all of the data (including the associative array) from a prior software plug-in module to the next software plug-in module (block 802 in FIG. 8). In the example, the next software plug-in module is authorization module 3204. Authorization module 3204 may use some of the information that was collected or generated by module 3202. Passing the information reduces the load on hardware by not sending a communication from proxy computer 140 to another computer (e.g., client computer 120) or making the same or similar function call to a shared resource for the same information.

The method can also comprise generating a function call to at least one of the shared resources using data within the associative array (block 822). Authorization module 3204 may make a function call to the parameter system to determine if the user has proper authorization, whether access can be granted (whether number of users currently connected to proxy computer has exceeded its limits), priority of connection (level or speed of service to be provided), etc. Module 3204 may pass user name and password when making the function call to the logging system. Module 3204 may also make a function call to the shared clock to obtain a time for the action.

The method can also comprise receiving data from the function call (block 824). The data may include information regarding whether user at client computer 120 has proper security clearance, whether the connection could be made, priority of the connection, and the like. The method can further comprise processing data from the function call with other code within the current software plug-in module (block 826). An example may include sending a communication from proxy computer 140 to client computer 120 informing the user whether the connection was made. Alternatively, no further processing may occur with module 3204.

A determination may be made whether the current software plug-in module is the last software plug-in module (diamond 842). If so, the method may end. Otherwise, the method may continue with block 802 in FIG. 8 and proceed in an iterative manner until the last software plug-in module is reached.

The remaining modules along row 3200 will be addressed to complete the example transaction to give a better understanding of actions within the modules and some function calls that those modules may make. More or fewer modules may be used. Also, more, fewer, or different function calls may be made by the modules.

Data can be passed to request manipulation software plug-in module 3206. A function call can be made to a shared resource to determine if the request should be changed. The function call may pass information that a request for www-.yahoo.com has been received or accessed. The shared resource may include logic to replace the original client request with www.google.com. The associative array may be changed to replace www.yahoo.com with www.google.com or be appended to note that the manipulated request is www-.google.com.

Module 3208 may perform the content retrieval. A function call can be made to a content cache (shared resource) at proxy computer 140 to determine if the content cache includes a network page for www.google.com specifically formatted for a computer having a Netscape™ browser and a MacOS X™ operating system. Note that the browser and operating system information can be obtained from the associative array. If the content cache has the network page, it can be passed to module 3208. Otherwise, module 3208 may formulate an HTTP request to server computer 160 requesting the network page for the specific browser and operating system of client computer 120. After proxy computer 140 obtains the proper network page from server computer 160, module 3208 may send a function call to the content cache at proxy computer 140 to cache the network page. The proper network page and other information previously collected may be sent to module 3210.

Content manipulation module 3210 may delete, add, or replace some or all of the content within the proper network page returned. For example, when the proper Google network page is received or accessed, module 3210 may add advertisement(s) around the border(s) of the page. A function call can be made to a shared resource to determine which advertisement(s) should be added. The logging system may keep track of which advertisement is being added, whose advertisement it is, and how many times the advertisement has been added during the current billing cycle. The logging system, which is a shared resource, may access the counter (another shared resource) by itself. In other works, some or all of the shared resources may interact with each other without requiring an application-specific software plug-in module to intervene. The manipulated content and other information may be passed to module 3212.

Content delivery software plug-in module 3212 may take the Google network page formatted for a Netscape™ browser and MacOS X™ operating system and the advertisement(s) from module 3210 and prepare a communication using HTTP. The communication can be sent from proxy computer 140 to client computer 120. Function calls can be made to the logging system to note the actual content sent to client computer 120 and time sent. Any or all information collected or generated by modules 3202-3212 may be passed to module 3214.

Post-response communications module 3214 may be used to track usage or billing information. At the end of a transaction, module 3214 may make a function call to the clock to determine the current time, and make another function call to the logging system to determine how much time lapsed during the transaction and record any billing information. The billing information may be within a shared resource managed by an accounting department. Billing information for the user at client computer 120 may be passed from one of the shared resources to module 3214, which may return some of the information for the user at client computer 120. Proxy computer 140 may send a message to client computer 120 similar to "You were connected for 2.1 minutes and were charged $1.27. Thank you for using our service." Alternatively, no message may be sent and the method may end.

Note that not all of the activities described in the process flow diagram in FIGS. 6-8 are required, that a limitation within a specific activity may not be required, and that further activities may be performed in addition to those illustrated. Also, some of the activities may be performed substantially simultaneously during with other activities. After reading this specification, skilled artisans will be capable of determining what activities can be used for their specific needs.

Figure 9:
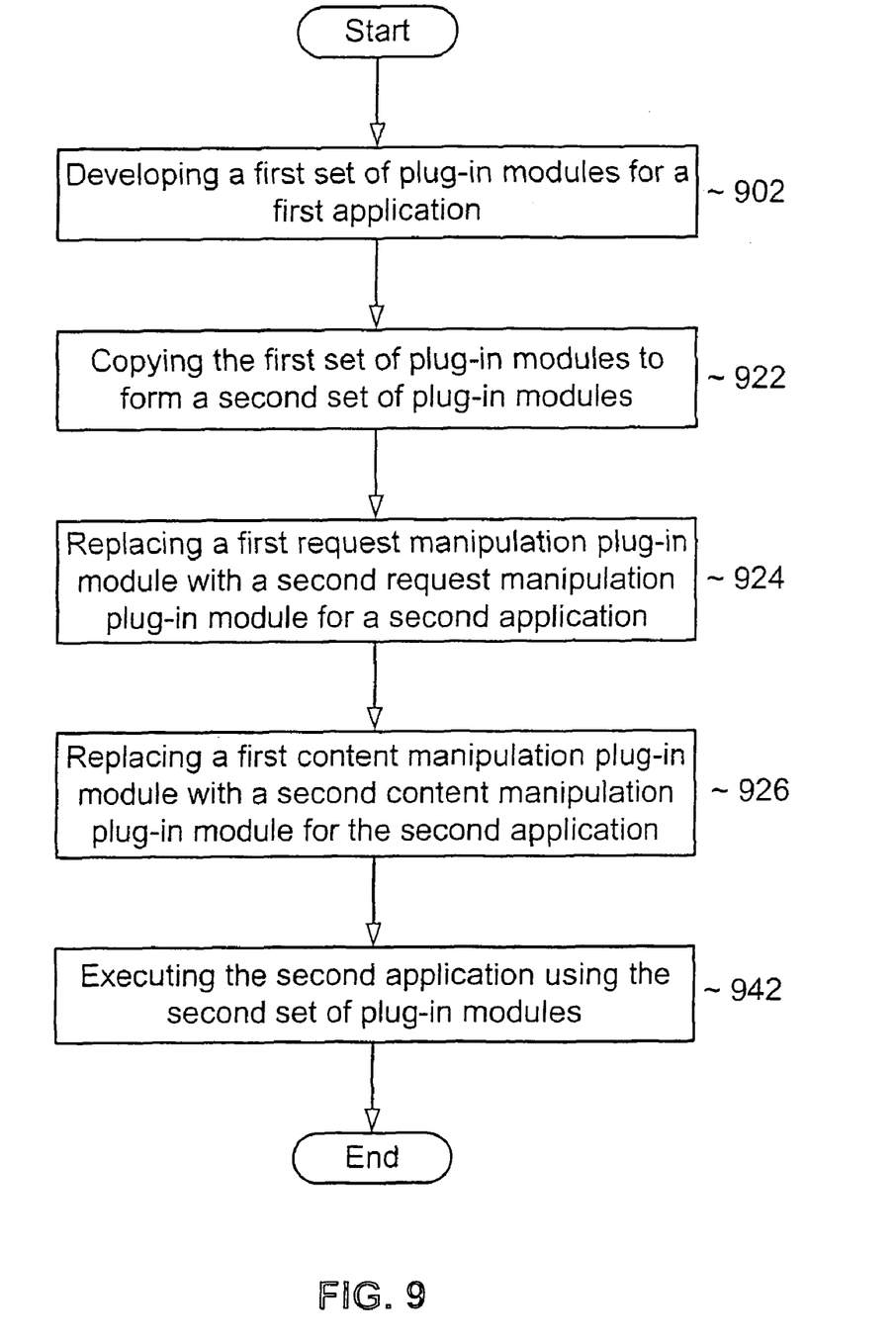
FIG. 9 includes a flow diagram of a method of changing software plug-in modules to develop new applications using the same protocol in accordance with an embodiment of the present invention.

The power of creating new applications for the same protocol may be better understood with the flow diagram in FIG. 9 and an example. In one embodiment, different applications may be generated for different priorities of users for a network site. The communication protocol may use HTTP. The method can comprise developing a first set of plug-in modules for a first application (block 902). The set may correspond to row 3200 and be directed to premium users of a network site.

A new application may need to be developed for regular users of the network site. The communication protocol may also use HTTP. The method can comprise copying the first set of plug-in modules to form a second set of plug-in modules (block 922).

For the new application, only the request manipulation plug-in module, the content manipulation plug-in module, or both may be replaced. The remainder of the plug-in modules may be unchanged and be substantially the same as the remainder of the plug-in modules for the first application.

The method may comprise replacing a first request manipulation plug-in module with a second request manipulation plug-in module for a second application (block 924). For example, the premium user may have access to some network pages that the regular user may not. If the regular user requests a premium page, the second request manipulation module may direct the regular user to another network page for which the regular user has proper access.

The method may also comprise replacing a first content manipulation plug-in module with a second content manipulation plug-in module for the second application (block 926). The premium user may have only 10 percent of his or her window occupied by advertisements, whereas the regular user may have 50 percent of his or her window occupied by advertisements. The second content manipulation module may reformat the retrieved content to allow for more advertising space. The second content manipulation module may also access the shared resources to obtain the advertisements and keep track of which advertisements were used. Device dependent optimization of network pages (desktop computer vs. cellular phone, etc.) can be achieved by plugging in a module which transcodes content using settings developed for the particular device that made the initial request.

After one or both of the request manipulation and content manipulation modules are replaced, the method can still further comprise executing the second application using the second set of plug-in modules (block 942).

Note that while the example focused more on replacing specific modules, in other embodiments, those modules may be generated by editing code within the corresponding modules within the first set for the first application.

After reading this specification, skilled artisans will appreciate that entirely different applications, using the same network protocol, can be developed by simply inserting new plug-in module(s) at the request manipulation location, the content request location, or both locations.

In other embodiments, the method and system may be used for nearly any other network communications. As an example, client computer 120 may make a request for information within a database located at server computer 160. The request may be handled in a manner similar to a request for a network page. If the user does not have proper authorization to all information within a request, the request manipulation module may request only that information for which the user has property access or the content manipulation module may add information stating that the user does not have proper access to some or all the information.

In another embodiment, the multiple-protocol software architecture and plug-in modules may be installed in client computer 120 or server computer 160. Not all modules in proxy computer 140 may be needed by client computer 120 or server computer 160. Authorization modules 3204, 3404, and 3604 may not be used or can be coded to allow authorization (always authorized) at client computer 120. The content manipulation modules 3210, 3410, and 3610 may not be used by the server computer 160. After reading this specification, skilled artisans are capable of determine which modules are needed and which ones can be eliminated or bypassed (module exists but passes information through without performing any other significant activity).

The software components can be designed to maximize their ability use shared resources while minimizing the amount of code used for application-specific operations. Therefore, relatively smaller plug-in modules (compared to the shared resources) may be used to access the shared resources illustrated in the planes below the modules. In this manner, less code needs to be written for a new protocol compared to the prior-art method of writing or copying and modifying an entire program for a specific protocol. For applications in the same protocol, the specific coding requirements may be much less. Furthermore, protocols are more likely to be supported because the coding requirements are less, and therefore, may be generated for protocols that have relatively fewer users compared to other protocols. The method and system are significantly more efficient in both time and cost compared to existing prior-art methods dealing with the problem of many different applications in the same or different protocols.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A computer-implemented method for developing network applications executable on a computer system embodying a multi-protocol software architecture, the method comprising:

developing a first set of plug-in modules for a first network application of the multi-protocol software architecture, wherein each plug-in module of the first set of plug-in modules, when executed by the computer system, performs one or more discrete actions of an electronic network transaction to be processed by the first network application;

forming a second set of plug-in modules from the first set of plug-in modules, wherein the first set of plug-in modules and the second set of plug-in modules each include a first data manipulation plug-in module;

replacing the first data manipulation plug-in module in the second set of plug-in modules with a second data manipulation plug-in module for a second network application, wherein the replacing step further comprises:

replacing a first request manipulation plug-in module in the second set of plug-in modules with a second request manipulation plug-in module, wherein replacing the first request manipulation plug-in module further comprises changing computer-executable code of the first request manipulation plug-in module to generate the second request manipulation plug-in module; and replacing a first content manipulation plug-in module in the second set of plug-in modules with a second content manipulation plug-in module, wherein replacing the first content manipulation plug-in module further comprises changing computer-executable code of the first content manipulation plug-in module to generate the second content manipulation plug-in module; and executing the second network application using the second set of plug-in modules, wherein the executing step is performed subsequent to the replacing step.

2. The computer-implemented method of claim 1, wherein the first data manipulation module comprises a request manipulation plug-in module.

3. The computer-implemented method of claim 1, wherein the first data manipulation module comprises a content manipulation plug-in module.

4. The computer-implemented method of claim 1, wherein replacing the first data manipulation plug-in module further comprises changing computer-executable code of the first data manipulation plug-in module to generate the second data manipulation plug-in module.

5. The computer-implemented method of claim 1, wherein the first network application and the second network application use the same or different network protocol.

6. A computer system for embodying a multi-protocol software architecture for processing network transactions, the system comprising:

a central processing unit;

a memory comprising a computer-readable medium communicatively coupled to the central processing unit;

a multi-protocol software architecture for processing network transactions encoded as computer-executable instructions in the memory, the multi-protocol software architecture comprising computer-executable instructions for:

developing a first set of plug-in modules for a first network application of the multi-protocol software architecture, wherein each plug-in module of the first set of plug-in modules, when executed by the computer system, performs one or more discrete actions of an electronic network transaction to be processed by the first network application;

forming a second set of plug-in modules from the first set of plug-in modules, wherein the first set of plug-in modules and the second set of plug-in modules each include a first data manipulation plug-in module;

replacing the first data manipulation plug-in module in the second set of plug-in modules with a second data manipulation plug-in module for a second network application, wherein the replacing step further comprises:

replacing a first request manipulation plug-in module in the second set of plug-in modules with a second request manipulation plug-in module, wherein replacing the first request manipulation plug-in module further comprises changing computer-executable code of the first request manipulation plug-in module to generate the second request manipulation plug-in module; and replacing a first content manipulation plug-in module in the second set of plug-in modules with a second content manipulation plug-in module, wherein replacing the first content manipulation plug-in module further comprises changing computer-executable code of the first content manipulation plug-in module to generate the second content manipulation plug-in module; and executing the second network application using the second set of plug-in modules, wherein the executing step is performed subsequent to the replacing step.

7. The computer system of claim 6, wherein the first data manipulation module comprises a request manipulation plug-in module.

8. The computer system of claim 6, wherein the first data manipulation module comprises a content manipulation plug-in module.

9. The computer system of claim 6, wherein replacing the first data manipulation plug-in module further comprises changing computer-executable code of the first data manipulation plug-in module to generate the second data manipulation plug-in module.

10. The computer system of claim 6, wherein the first network application and the second network application use the same or different network protocol.

11. A computer program product for developing network applications executable on a computer system embodying a multi-protocol software architecture, the computer program product comprising computer-executable instructions encoded in at least one non-transitory computer-readable medium that, when executed by the computer system, cause the computer system to perform the steps of:

developing a first set of plug-in modules for a first network application of the multi-protocol software architecture, wherein each plug-in module of the first set of plug-in modules, when executed by the computer system, performs one or more discrete actions of an electronic network transaction to be processed by the first network application;

forming a second set of plug-in modules from the first set of plug-in modules, wherein the first set of plug-in modules and the second set of plug-in modules each include a first data manipulation plug-in module;

replacing the first data manipulation plug-in module in the second set of plug-in modules with a second data manipulation plug-in module for a second network application, wherein the replacing step further comprises:

replacing a first request manipulation plug-in module in the second set of plug-in modules with a second request manipulation plug-in module, wherein replacing the first request manipulation plug-in module further comprises changing computer-executable code of the first request manipulation plug-in module to generate the second request manipulation plug-in module; and replacing a first content manipulation plug-in module in the second set of plug-in modules with a second content manipulation plug-in module, wherein replacing the first content manipulation plug-in module further comprises changing computer-executable code of the first content manipulation plug-in module to generate the second content manipulation plug-in module; and executing the second network application using the second set of plug-in modules, wherein the executing step is performed subsequent to the replacing step.

12. The computer program product of claim 11, wherein the first data manipulation module comprises a request manipulation plug-in module.

13. The computer program product of claim 11, wherein the first data manipulation module comprises a content manipulation plug-in module.

14. The computer program product of claim 11, wherein replacing the first data manipulation plug-in module further comprises changing computer-executable code of the first data manipulation plug-in module to generate the second data manipulation plug-in module.

15. The computer program product of claim 11, wherein the first network application and the second network application use the same or different network protocol.

* * * * *